Jan. 17, 1950     C. C. ROBERTS     2,495,134
FISH LURE
Filed Jan. 27, 1948
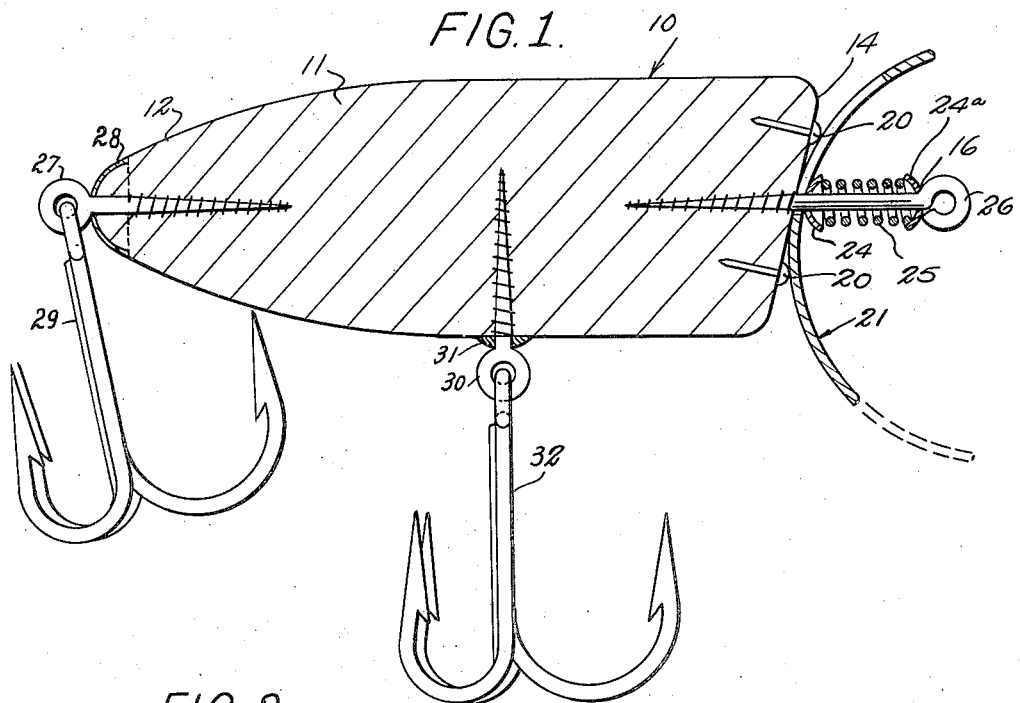
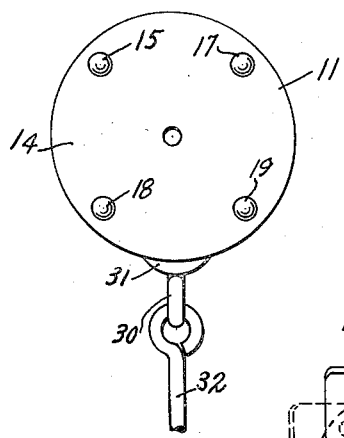
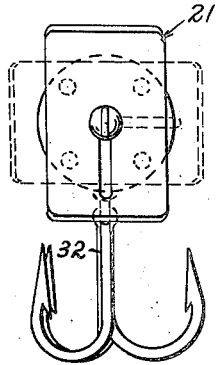
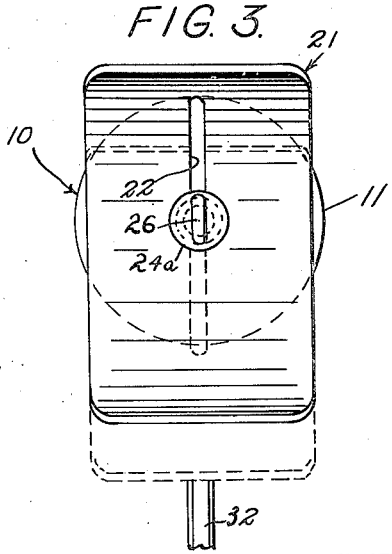
INVENTOR.
Constance C. ROBERTS,
BY
McMorrow, Berman & Davidson
ATTORNEYS.

Patented Jan. 17, 1950

2,495,134

UNITED STATES PATENT OFFICE 2,495,134

FISH LURE

Constance C. Roberts, Mosinee, Wis.

Application January 27, 1948, Serial No. 4,556

2 Claims. (Cl. 43—42.22)

This invention relates to an improved fish lure.

It is an object of this invention to provide an improved fishing lure of the kind to be more particularly described hereinafter having a concavo-convex plate mounted on the front end thereof and means for adjusting the plate so that the lure may have a vertical wobbling motion or a horizontally wobbling motion at the will of the fisherman.

Another object of this invention is to provide a lure of this kind in which the adjustment of the front plate may be sustained by a spring carried by the lure of such a strength that the plate will be maintained in position in the normal use of the lure, but may be changed and adjusted by the normal or slightly exaggerated force of the fingers of the fisherman.

With the above and other objects in view, my invention consists in the arrangement, combination and details of construction disclosed in the drawings and specification, and then more particularly pointed out in the appended claims.

In the drawings,

Figure 1 is a longitudinal, medial cross section of a fishing lure constructed according to my invention, Figure 2 is a front elevation with the plate removed, Figure 3 is a front elevation, and Figure 4 is a front elevation of the plate adjusted oppositely from the adjustment shown in Figure 3.

Referring to the drawings, the numeral 10 designates generally an improved fishing lure which may be used as a lure which will wobble under the water when the front plate is adjusted to certain positions or may be transformed into a type known as the popping surface lure in other adjusted positions of the plate.

The lure 10 is formed of a plug body 11 which may be formed of wood or plastic or other suitable material. The plug 11 is substantially cylindrical in cross section, having a conical rear end 12 and a flat front surface 14.

The front surface 14 is in a plane disposed at an angle other than a right angle to the longitudinal axis of the plug 11, the shorter length of the plug being disposed at the bottom thereof.

A central pin or screw 16 is engaged in the plug body 11 substantially at the center of the front surface 14. A pair of longitudinally spaced apart pins as 15 and 17 are pressed into the face 14 on opposite sides of and above the screw 16. A pair of pins 18 and 19 are disposed on opposite sides of and below the screw 16.

The pins 15, 17, 18 and 19 are formed with semi-spherical heads, as indicated by the numeral 20 in Figure 1 of the drawing, to provide forwardly extending detents on the flat surface 14.

The detents 20 provide bearing surfaces for the plate 21 to be described. This plate is formed of a piece of thin metal or other suitable rigid material of elongated, rectangular shape bent into a segmental arcuate configuration.

The plate 21 is concavo-convex and is attached to the plug 11 with its concave face disposed forwardly. This plate is formed with an elongated slot 22 extending along the mid-width portion thereof from a point near one end substantially to the mid-length portion of the plate. The shank of the screw 16 extends through the slot 22 in the plate 21 and into the body 11.

A spherical washer 24 is disposed about the shank of the bolt 16 for engagement with the outer surface of the plate 21. A spring 25 is coiled about the shank of the pin or screw 16 forwardly of the plate 21 and engages at one end in the forwardly extending concave of the washer 24.

A second washer 24a, concavo-convex in configuration, is disposed about the opposite or outer end of the screw 16 and the outer end of the spring 25 engages in the inwardly disposed concave side of the washer 24a.

The eye 26 on the extreme forward end of the screw 16 restrains the forward washer 24a against movement and provides a means for attaching the lure 10 to a fishing line.

The spring 25 continually exerts a bearing force on the plate 21 for holding the plate in engagement with the flat surface 14. As the convex surface of the plate 21 will engage the face 14 along a line radial relative to the screw 16, the detents or heads 20 of the pins 15, 17, 18 and 19 provide bearings for the convex surface of the plate 21 spaced from the screw 16.

With the plate 21 disposed in a position as shown in Figures 1 and 3 of the drawings, the slot 22 is disposed at the upper end of the plate above the screw 16. In this position of the plate the lure travels under water while being retrieved and also wobbles from side-to-side. When it is desired to increase the diving force of the plug 11, the plate 21 may be slid downwardly relative to the screw 16 to the position as shown in dotted lines in Figures 1 and 3.

When it is desired to use the lure as a surface type lure, the plate 21 is rotated 90 degrees so that the slot 22 extends laterally to one side of the screw 16 as shown in dotted lines in Figure 4 of the drawings. When the lure is pulled over the surface of the water with plate 21 in the 90 degree position indicated, the lure wobbles from side-to-side as in its submerged operation.

When it is desired to use the lure as a popping surface lure, that is, one that splashes when twitched by jerking or sharply raising the fishing rod, the plate is turned through 180 degrees from the position shown in Figure 1 to the position shown in full lines Figures 4. The amount of splash produced can be controlled by adjusting plate 21 relative to screw 16 in the direction opposite that indicated above in connection with Figure 1.

The slot 22 may be disposed on either side of the screw 16 by rocking the plate 21 or pivoting it to the position desired. The disposition of the detents is such to provide the forwardly disposed bearing surface for the plate 21 in any position of the plate in its selected pivoted or slidably adjusted position.

A screw eye 27 is screwed into the rear, conical end of the body 11 and concavo-convex washer 28 surrounds the shank of this screw eye adjacent the eye thereof and receives the rounded rear end of the body 11. A triple hook 29 is pivotally connected to the screw eye 27. A second screw eye 30 is screwed into the bottom side of the body 11 intermediate the length of the body and a washer 31 surrounds the shank of this screw eye between the eye thereof and the body 11. A triple hook 32 is pivotally connected at one end to the screw eye 30.

Having thus described my invention, what I claim is:

1. A fish lure comprising an elongated plug body having a flat forward end, a pin extending forwardly from said flat forward end and providing at its outer end a line attaching eye, a plurality of rounded detents on said forward end surrounding said pin and spaced from said pin and from each other, an elongated, rectangular plate having a concavo-convex curvature disposed on the forward end of said plug body with its concave side directed forwardly and its convex side bearing on said detents, said plate having therein an elongated slot extending from a point adjacent one end substantially to the mid-length portion of said plate along the mid-width portion of the plate and receiving said pin, a spring carried by said pin and bearing against the concave side of said plate to force the convex side of the latter into frictional engagement with said detents, and a concavo-convex washer interposed between said spring and the concave side of said plate.

2. A fishing lure comprising an elongated plug having a flat, forward end, a pin extending forwardly from said flat, forward end substantially centrally thereof, a pair of spaced apart, rounded detents on the flat, forward end of said plug disposed above said pin and at respectively opposite sides of the latter, a pair of spaced apart, rounded detents on the flat, forward end of said plug disposed below said pin and a respectively opposite sides of the latter, a concavo-convex plate having an elongated slot therein receiving said pin, said plate being disposed with the convex face thereof adjacent the flat end of said plug and engaging said detents, and spring means carried by said pin and engaging said plate on the concave side thereof to frictionally hold said plate in selected positions of adjustment on said plug.

CONSTANCE C. ROBERTS.

REFERENCES CITED

The following references are of record in the file of this patent:

UNITED STATES PATENTS

| Number | Name | Date |
| --- | --- | --- |
| 1,499,819 | Goble | July 1, 1924 |
| 1,842,591 | Dunkelberger | Jan. 26, 1932 |
| 2,008,250 | Haas | July 16, 1935 |
| 2,134,330 | Fink | Oct. 25, 1938 |

FOREIGN PATENTS

| Number | Country | Date |
| --- | --- | --- |
| 67,717 | Norway | Apr. 11, 1944 |